G. J. & F. E. BAKER.
DRIVING MECHANISM.
APPLICATION FILED MAY 16, 1910.

1,010,111.

Patented Nov. 28, 1911.

UNITED STATES PATENT OFFICE.

GEORGE J. BAKER AND FRANK E. BAKER, OF ROYAL OAK, MICHIGAN.

DRIVING MECHANISM.

1,010,111.      Specification of Letters Patent.      Patented Nov. 28, 1911.

Application filed May 16, 1910. Serial No. 561,737.

*To all whom it may concern:*

Be it known that we, GEORGE J. BAKER and FRANK E. BAKER, citizens of the United States, residing at Royal Oak, county of Oakland, State of Michigan, have invented a certain new and useful Improvement in Driving Mechanism, and declare the following to be a full, clear, and exact description of the same, such as will enable others skilled in the art to which it appertains to make and use the same, reference being had to the accompanying drawings, which form a part of this specification.

Figure 1:
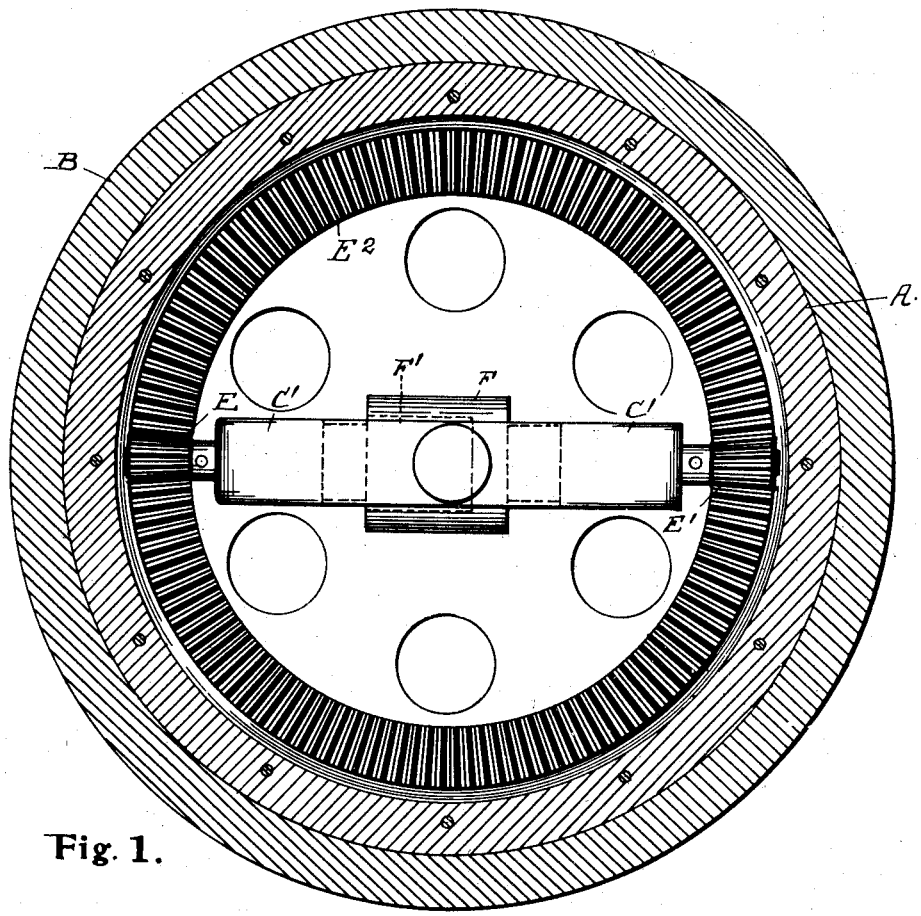
Figure 2:
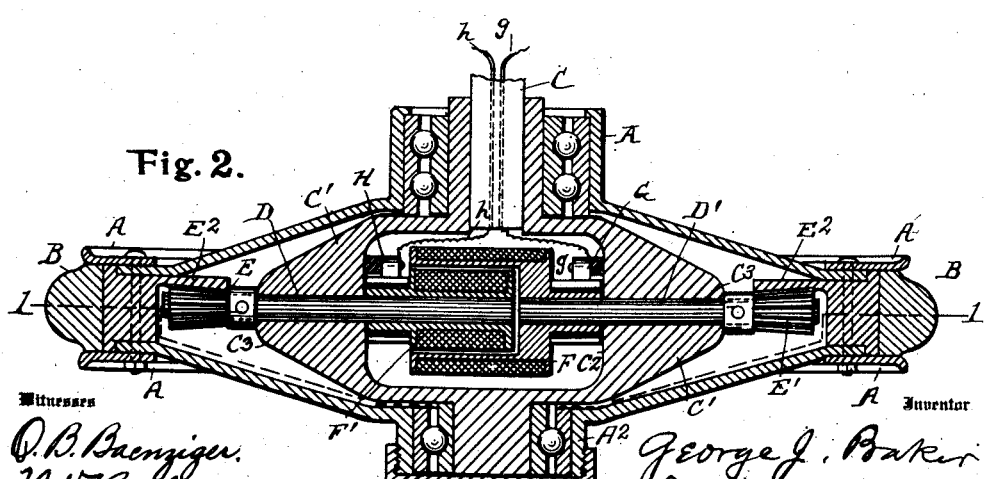

This invention relates to the transmission of rotary motion by means of an electric motor, and its object is to provide a construction which is extremely compact, symmetrical, self-containing, simple and of high efficiency, and consists in the matters hereinafter described, and more particularly pointed out in the claim, reference being had to the accompanying drawings, in which:

Figure 1, is a plan view of a motor employing our invention. Fig. 2, is a sectional view on line $x$—$x$ Fig. 1.

In Fig. 1, there is represented a rotatable wheel in which the motor is inclosed with the front face of the wheel removed showing the motor in position therein. Fig. 2, shows the internal arrangement thereof in cross section; all details not necessary to the understanding of the motor construction being omitted.

Heretofore motors have been embodied in vehicle or other wheels adapted to rotate around a fixed axis, the fixed axis carrying the motor, power therefrom being transmitted to the wheel by means of bevel gearing, but it has been heretofore found necessary to employ two bevel gears or racks fixedly connected with the wheel which is rotated and to have one member, as the field, of the electric motor attached to the fixed axle around which the wheel rotates; while the armature is fixed to a revolving shaft having at each end pinions one engaging one of the racks and the other at the opposite side of the wheel engaging the other of the racks. This construction is open to several objections even though compensating devices are put in between the two pinions upon the shaft, as has also been attempted, but to introduce such compensating devices largely increases the complication and liability to get out of order and is a serious objection to the employment of motors of this type when inclosed within a propelling wheel as stated; it being obvious that the more simple such constructions can be the better, as it reduces the weight of the traveling wheel and the liability to derangement and also the wheel does not have to be as bulky. We attain the improved results specified by the mechanism hereinafter described.

In the drawings similar letters refer to similar parts.

A, represents a wheel having a periphery B, which in the form we have shown it contains a hard rubber tire, but it is obvious that any form of periphery might be employed, such as spur gear, or it might be fitted as a band wheel to suit any purpose for which it is used,—*i. e.*, that of transmitting power and motion to other machinery.

C, is a fixed axle, preferably hollow for the purpose hereinafter described. This axle is fixed to any support or it may be the fixed dead axle of a car and held in any manner which would prevent its rotating. The wheel A is mounted upon this axle by means of a large hub $A^1$, $A^2$, preferably by ball or other bearings of like nature which permit of the relative rotation of the wheel. The end of the axle C is enlarged or carries a yoke $C^1$ non-rotatably attached to the axle, but which may be removed therefrom if and whenever desired. The yoke $C^1$ has a substantially symmetrical open space $C^2$, at right angles to the end of the axle C. This yoke is bored in axial line from end to end at $C^3$, $C^3$, and journaled in each end of the yoke in the holes thus formed, by any appropriate boxing, are two shafts D, $D^1$. Upon the outer end of each shaft is a bevel gearing E, $E^1$; these bevel gears E, $E^1$ mesh into one bevel rack $E^2$, $E^2$, which is formed upon the inside of the periphery of the wheel, as shown in Fig. 1. It is obvious that on the rotation of the wheel A, around the fixed axle C, the pinions E, $E^1$, must revolve in opposite directions, therefore the shafts D, $D^1$, revolve oppositely.

Upon the shaft $D^1$, is firmly attached the field magnets F, of a motor, and to the shaft D, is firmly attached the armature $F^1$ of said motor. There is nothing new about the motor itself, the field magnet being wound and the armature arranged in the usual manner of all motors and this winding and arrangement forms no part of our invention. To the hub of the field at G, there is a brush of the usual form connected to leading-in wires $g$, which passes through insulated perforations in the axle C, or in any approved manner to a source of electricity; of course, this wire is insulated throughout its extent. Upon the hub armature $F^1$, there is also a brush connection H, with leading-in wires $h$, which also may pass through a perforation in the axle C, or in grooves formed therein, and thence to the opposite pole of such source of electricity. About these features in themselves there is nothing new and therefore they are not described in detail, the operation being precisely the same as though the field was held rigidly and the armature alone revolved, except that the field should have a brush connection to allow for its rotation instead of a fixed connection. It is obvious that the motor will operate just the same as though either the field or the armature was fixed and the other member, field or armature, was allowed to revolve; the motor, of course, being a transformer thus transforms electrical force into mechanical motion and force in the usual manner in such motors and it might be one of a number of forms of motors depending upon the winding and other details of construction about which there is nothing new and which, as stated, form no part of our invention.

Of course there are many details relating to boxing, as, for instance, whether it would be desirable to use either fixed or rotative bearings which might be modified and which we do not think necessary to show and which, in fact, would only complicate the drawings to show them, as obviously they form no part of our invention.

It is obvious that any inequalities or irregularities in the rotative motion of the two shafts D, $D^1$, carrying their pinions E, $E^1$, would be compensated through the motion of the field and armature therefore there would be no strain upon the gearing due to such irregularities and no compensating device. It is also obvious that both pinions together with the shafts D, $D^1$, and therefore the armature and the field, must revolve at the same rate of speed in the same unit of time in the structure as shown, but even this is not necessary as, for instance, a second rack might be employed with a smaller or larger pinion working thereon and connected to either the field or the armature and be allowed to revolve at a different rate of speed from a companion member of the motor therefore equal speeds is not necessary, but a great convenience as shown in the organization. It is also obvious that a rotative speed, say of 500 revolutions for the armature and 500 revolutions for the field with their accompanying shafts, etc., would be equivalent to ratios of speeds with a fixed field and an armature of equal size revolving at 1000 revolutions, therefore by our construction we secure the same efficiency of motor by the differential opposite motion of the two shafts and the two elements of the motor, at one-half of the rate of speed, which would be necessary in case one of the members of the motor such as the field was fixed and the other obliged to travel fast enough to make up for that fixed position. It is obvious therefore that our shafts of field and armature are not required to revolve as rapidly as otherwise and that with the same ratio of gearing between pinions E, $E^1$, and rack $E^2$, at one-half the speed that it would be required to revolve in case the field was fixed to the axle and did not revolve and the armature alone revolved, because in such case the armature would have to revolve at twice the speed that it would where both revolve as we have arranged it. This enables us, especially in trucks, to gear down without complications and thereby increase the power which also is a great advantage because in constructions of this kind the range of the ratio of gearing is not very large, and it is obvious that in case any one of the shafts upon which is fixed either the revolving armature or a revolving field, if obliged to travel at a high rate of speed to attain efficiency in the motor, must be correspondingly geared down to the traveling wheel A, and it is not easy to make pinions small enough so that the teeth can be large enough to be efficient and dependable under great strain. It is also obvious that the toothed rack or rim may be rigidly held by any appropriate means and in such case the motor would drive its framework attached to the axle by allowing the axle to rotate freely and in this manner the motor might be made to reverse the driving action driving the axle in place of driving the rim.

We do not desire to limit our invention to driving the rim only as it is obvious that such invention could be applied either way.

While we have shown a motor embodied in a vehicle driving wheel, yet it will be understood that, and it will be obvious that the invention is not limited to that particular application, but is adapted to a variety of applications, its being embodied in a vehicle wheel not being an essential feature of the invention.

The operation of this invention is sufficiently obvious from the preceding description.

What we claim as our invention is:

In an electric traction wheel, the combination of a fixed frame including an axle, a wheel member mounted for rotation on said axle and provided at the inner side of its periphery in the plane thereof with a single circular toothed rack, a pair of shafts journaled for rotation in the fixed frame and arranged end to end in axial alinement within the wheel member, a motor comprising an armature fixed to the inner end of one of said shafts, and field magnets fixed concentrically to the inner end of the other shaft and inclosing the armature, each of said shafts being provided with a toothed drive pinion fixed at its outer end and meshing with the toothed rack of the wheel member, said shafts being adapted to be rotated in opposite directions by the motor to positively drive the wheel member, and means for transmitting electricity from a source of electric energy to said field magnets and armature.

In testimony whereof, we sign this specification in the presence of two witnesses.

GEORGE J. BAKER.
FRANK E. BAKER.

Witnesses:
R. A. PARKER,
N. V. BELLES.